United States Patent
Krivenok

(10) Patent No.: US 11,206,178 B2
(45) Date of Patent: Dec. 21, 2021

(54) SYSTEMS AND METHODS FOR NETWORK MTU MANAGEMENT FOR CLUSTERED AND FEDERATED STORAGE SYSTEMS

(71) Applicant: EMC IP Holding Company, LLC, Hopkinton, MA (US)

(72) Inventor: Dmitry Vladimirovich Krivenok, St Petersburg (RU)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 70 days.

(21) Appl. No.: 16/661,135

(22) Filed: Oct. 23, 2019

(65) Prior Publication Data

US 2020/0252344 A1    Aug. 6, 2020

(30) Foreign Application Priority Data

Jan. 31, 2019   (RU) .......................... RU2019113323

(51) Int. Cl.
| | |
|---|---|
| *H04W 56/00* | (2009.01) |
| *H04L 12/24* | (2006.01) |
| *H04L 29/12* | (2006.01) |
| *H04L 12/46* | (2006.01) |
| *H04L 12/805* | (2013.01) |
| *H04L 12/935* | (2013.01) |
| *H04L 12/931* | (2013.01) |
| *H04L 29/06* | (2006.01) |
| *H04L 29/08* | (2006.01) |

(52) U.S. Cl.
CPC ...... *H04L 41/0806* (2013.01); *H04L 12/4633* (2013.01); *H04L 41/12* (2013.01); *H04L 47/36* (2013.01); *H04L 49/30* (2013.01); *H04L 49/70* (2013.01); *H04L 61/2007* (2013.01); *H04L 61/2046* (2013.01); *H04L 61/6086* (2013.01); *H04L 63/166* (2013.01); *H04L 69/323* (2013.01)

(58) Field of Classification Search
CPC . H04L 41/0806; H04L 12/4633; H04L 41/12; H04L 47/36; H04L 49/30; H04L 49/70; H04L 61/2007; H04L 61/2046
USPC ........................................................ 370/389
See application file for complete search history.

(56) References Cited

U.S. PATENT DOCUMENTS

| | | | | |
|---|---|---|---|---|
| 9,602,389 | B1 * | 3/2017 | Maveli | H04L 67/1017 |
| 10,498,611 | B1 * | 12/2019 | Kloberdans | H04L 41/5054 |
| 10,853,148 | B1 * | 12/2020 | Kenney | G06F 9/4881 |
| 2002/0141448 | A1 * | 10/2002 | Matsunaga | H04L 47/36 |
| | | | | 370/469 |

(Continued)

*Primary Examiner* — Sai Ming Chan
(74) *Attorney, Agent, or Firm* — Brian J. Colandreo; Mark H. Whittenberger; Holland & Knight LLP

(57) ABSTRACT

Embodiments included herein may be configured for managing one or more maximum transmission units (MTUs) for clustered and federated storage systems. Embodiments may include providing one or more heterogeneous storage clusters. A logical MTU may be configured on one or more leaf network interfaces of one or more networks. A physical network MTU may be configured on one or more intermediate network objects of the one or more networks. One or more physical network fabrics of the one or more networks may be managed. The physical network MTU may be managed via one of the one or more MTU domains. The physical network MTU may be reconfigured in response to determining the physical network MTU is outside of a pre-determined range.

20 Claims, 9 Drawing Sheets

(56) References Cited

U.S. PATENT DOCUMENTS

2015/0365357 A1* 12/2015 Sreeramoju ............. H04L 47/36
                                                    370/218
2018/0052858 A1*  2/2018 Soncodi .............. G06F 16/2272
2018/0095915 A1*  4/2018 Prabhakar ............... H04L 47/36
2019/0149819 A1*  5/2019 Phillips ................ H04L 65/607
                                                    375/240.02

* cited by examiner

SYSTEMS AND METHODS FOR NETWORK MTU MANAGEMENT FOR CLUSTERED AND FEDERATED STORAGE SYSTEMS

RELATED APPLICATIONS

This application claims priority from Russian Patent Application Number 2019113323, filed on 31 Jan. 2019, at the Patent Office of the Russian Federation, Russia, entitled "SYSTEMS AND METHODS FOR NETWORK MTU MANAGEMENT FOR CLUSTERED AND FEDERATED STORAGE SYSTEMS," the entire contents of which are hereby incorporated by reference.

TECHNICAL FIELD

This disclosure relates to network management, and, more particularly, to systems and methods for managing network maximum transmission unit (MTU) for clustered and federated storage systems.

BACKGROUND

In storage systems and network equipment, there is generally some level of support for jumbo frames intended to improve network and storage performance in certain scenarios and required for many advanced technologies like tunneling. A jumbo frame has a maximum transmission unit (MTU) larger than the default MTU of 1500, where the MTU represents the maximum size of a single data unit that can be transmitted over a packet or frame-based network. Unfortunately, management of MTUs is often implemented very poorly, especially in complex clustered storage systems. For example, if a MTU is set too high, it may be dropped by an intermediate switch or a remote host. If a MTU is set too low, several data packets may have to be sent rather than one or more larger data packets. As a result, there may be configuration errors, network downtime, and/or increased total cost of ownership (TCO). MTU management is often considered an advanced reconfiguration operation and involves a number of manual steps performed on different components of a heterogeneous storage cluster and network fabrics. This process is usually not automated and needs to be repeated on every node of the heterogeneous storage cluster. Failure to execute the required steps in the right order may lead to connectivity disruptions.

In known approaches, hyper-converged infrastructure (HCI) systems may automate MTU management on physical ports of the HCI system by means of a virtualization manager. However, even though MTU management on the physical ports is automated, management of a logical network MTU is still a separate manual operation that requires changes on every node of the HCI cluster. Further, some storage systems try to simplify MTU management by introducing a simple "Jumbo frames enable/disable" mode. However, in execution, this simplification may lead to poor resources utilization.

SUMMARY

In one embodiment of the present disclosure, a computer-implemented method for cluster-wide management of one or more maximum transmission units (MTUs) for clustered and federated storage systems comprising providing one or more heterogeneous storage clusters. Each of the one or more heterogeneous storage clusters may include a logical network MTU and a physical network MTU. The logical network MTU and the physical network MTU may be separate from one another. The logical MTU may be configured on one or more leaf network interfaces of one or more networks. A first network of the one of more networks may include one or more requirements of a first logical network and a second network of the one or more networks may include one or more requirements of a second network. The one or more requirements of the first network may be different from and may not affect the one or more requirements of the second network. The physical network MTU may be configured on one or more intermediate network objects of the one or more networks. The configuration of the physical network MTU may occur independently of configuring the logical network MTU. One or more physical network fabrics of the one or more networks may be managed. The one or more physical network fabrics may be managed via one or more MTU domains. The physical network MTU may be managed via one of the one or more MTU domains. The physical network MTU may be reconfigured in response to determining the physical network MTU is outside of a pre-determined range.

One or more of the following features may be included. The one or more heterogeneous storage clusters may include one or more third-party components. The one or more third-party components may be embedded into the one or more heterogeneous storage clusters via containerization technologies by separating one or more of a portion of the logical network MTU and a portion of the physical network MTU. The physical network MTU may be configured on one or more intermediate network objects of the one or more networks may allow for encapsulation of the one or more networks and use of one or more hyper-converged infrastructure (HCI) systems without affecting at least a portion of the first logical network and at least a portion of the second logical network. The one or more HCI systems may include one or more of virtual switch managed network ports and network ports managed directly by a virtualized storage controller. The one or more MTU domains may include one or more of a uniform MTU domain (UMD) and a non-uniform MTU domain (NUMD). The logical network MTU may be reconfigured in response to determining the logical network MTU is outside of a pre-determined range. The one or more heterogeneous storage clusters may be configured to support jumbo frames while avoiding over-provisioning of system buffers.

In one embodiment of the present disclosure, a computing system including a processor and a memory system may be configured to perform operations including providing one or more heterogeneous storage clusters. Each of the one or more heterogeneous storage clusters may include a logical network MTU and a physical network MTU. The logical network MTU and the physical network MTU may be separate from one another. The logical MTU may be configured on one or more leaf network interfaces of one or more networks. A first network of the one of more networks may include one or more requirements of a first logical network and a second network of the one or more networks may include one or more requirements of a second network. The one or more requirements of the first network may be different from and may not affect the one or more requirements of the second network. The physical network MTU may be configured on one or more intermediate network objects of the one or more networks. The configuration of the physical network MTU may occur independently of configuring the logical network MTU. One or more physical network fabrics of the one or more networks may be managed. The one or more physical network fabrics may be managed via one or more MTU domains. The physical network MTU may be managed via one of the one or more MTU domains. The physical network MTU may be reconfigured in response to determining the physical network MTU is outside of a pre-determined range.

One or more of the following features may be included. The one or more heterogeneous storage clusters may include one or more third-party components. The one or more third-party components may be embedded into the one or more heterogeneous storage clusters via containerization technologies by separating one or more of a portion of the logical network MTU and a portion of the physical network MTU. The physical network MTU may be configured on one or more intermediate network objects of the one or more networks may allow for encapsulation of the one or more networks and use of one or more hyper-converged infrastructure (HCI) systems without affecting at least a portion of the first logical network and at least a portion of the second logical network. The one or more HCI systems may include one or more of virtual switch managed network ports and network ports managed directly by a virtualized storage controller. The one or more MTU domains may include one or more of a uniform MTU domain (UMD) and a non-uniform MTU domain (NUMD). The logical network MTU may be reconfigured in response to determining the logical network MTU is outside of a pre-determined range. The one or more heterogeneous storage clusters may be configured to support jumbo frames while avoiding over-provisioning of system buffers.

In another embodiment of the present disclosure, a computer-implemented product comprising a non-transitory computer readable storage medium having plurality of instructions stored thereon, which, when executed by a processor, may cause the processor to perform operations including providing one or more heterogeneous storage clusters. Each of the one or more heterogeneous storage clusters may include a logical network MTU and a physical network MTU. The logical network MTU and the physical network MTU may be separate from one another. The logical MTU may be configured on one or more leaf network interfaces of one or more networks. A first network of the one of more networks may include one or more requirements of a first logical network and a second network of the one or more networks may include one or more requirements of a second network. The one or more requirements of the first network may be different from and may not affect the one or more requirements of the second network. The physical network MTU may be configured on one or more intermediate network objects of the one or more networks. The configuration of the physical network MTU may occur independently of configuring the logical network MTU. One or more physical network fabrics of the one or more networks may be managed. The one or more physical network fabrics may be managed via one or more MTU domains. The physical network MTU may be managed via one of the one or more MTU domains. The physical network MTU may be reconfigured in response to determining the physical network MTU is outside of a pre-determined range.

One or more of the following features may be included. The one or more heterogeneous storage clusters may include one or more third-party components. The one or more third-party components may be embedded into the one or more heterogeneous storage clusters via containerization technologies by separating one or more of a portion of the logical network MTU and a portion of the physical network MTU. The physical network MTU may be configured on one or more intermediate network objects of the one or more networks may allow for encapsulation of the one or more networks and use of one or more hyper-converged infrastructure (HCI) systems without affecting at least a portion of the first logical network and at least a portion of the second logical network. The one or more HCI systems may include one or more of virtual switch managed network ports and network ports managed directly by a virtualized storage controller. The one or more MTU domains may include one or more of a uniform MTU domain (UMD) and a non-uniform MTU domain (NUMD). The logical network MTU may be reconfigured in response to determining the logical network MTU is outside of a pre-determined range. The one or more heterogeneous storage clusters may be configured to support jumbo frames while avoiding over-provisioning of system buffers.

The details of one or more example embodiments are set forth in the accompanying drawings and the description below. Other possible example features and/or possible example advantages will become apparent from the description, the drawings, and the claims. Some embodiments may not have those possible example features and/or possible example advantages, and such possible example features and/or possible example advantages may not necessarily be required of some embodiments.

BRIEF DESCRIPTION OF THE DRAWINGS

Like reference symbols in the various drawings indicate like elements.

DETAILED DESCRIPTION

Embodiments of the present disclosure are directed towards systems and methods of network MTU management for clustered and federated storage systems. In some embodiments, the teachings of the present disclosure introduces a new method of network MTU management for clustered and federated storage systems.

Figure 1:
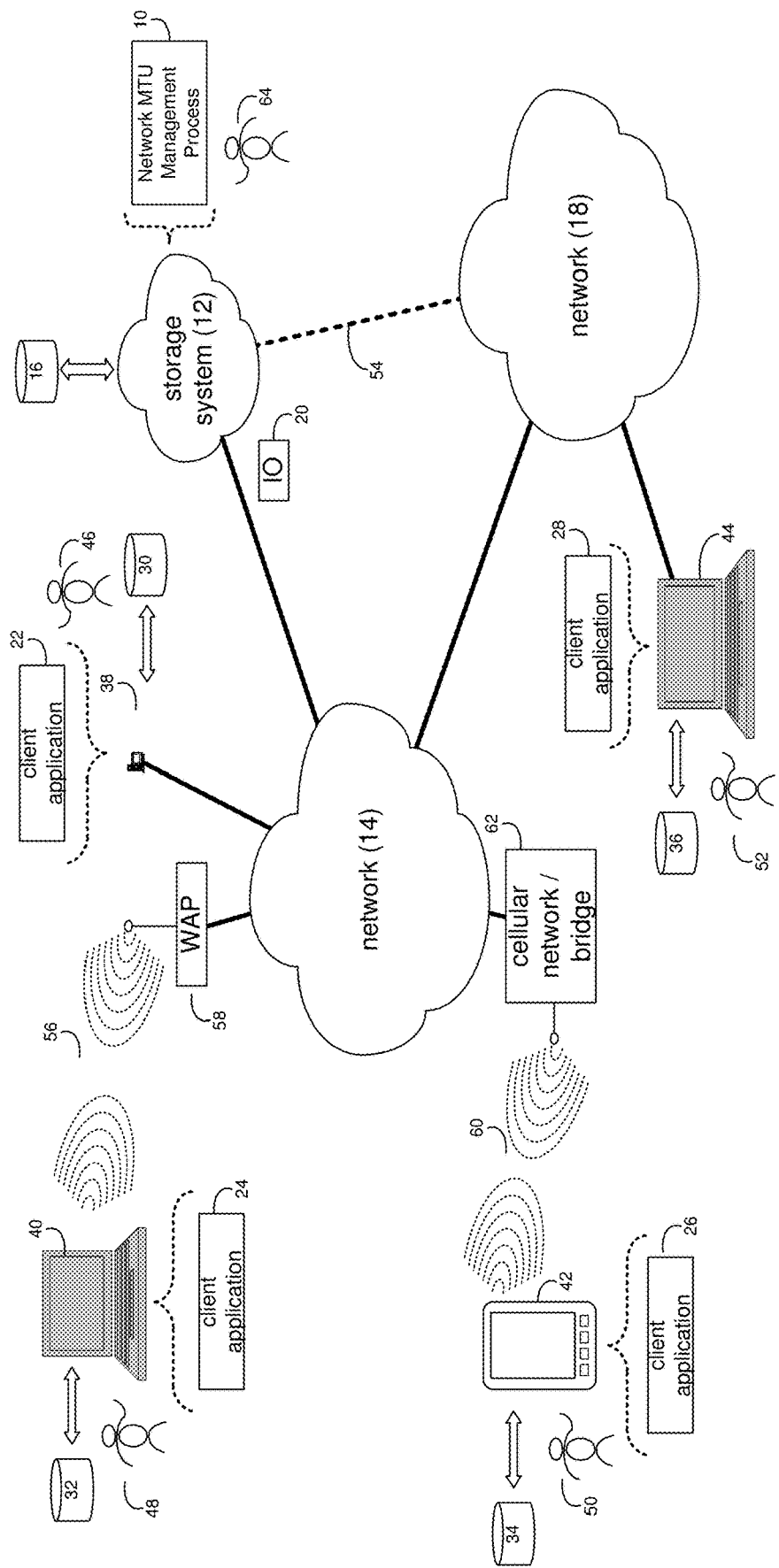
FIG. 1 is diagram depicting an embodiment of a network MTU management system in accordance with the present disclosure.

Referring to FIG. 1, there is shown network MTU management process 10 for clustered and federated storage systems that may reside on and may be executed by storage system 12, which may be connected to network 14 (e.g., the Internet or a local area network). Examples of storage system 12 may include, but are not limited to, high-availability storage systems such as: a Network Attached Storage (NAS) system, a Storage Area Network (SAN), a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems (OS), examples of which may include but are not limited to: Microsoft Windows Server™; Redhat Linux™, Unix, or a custom operating system, for example.

The instruction sets and subroutines of network MTU management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
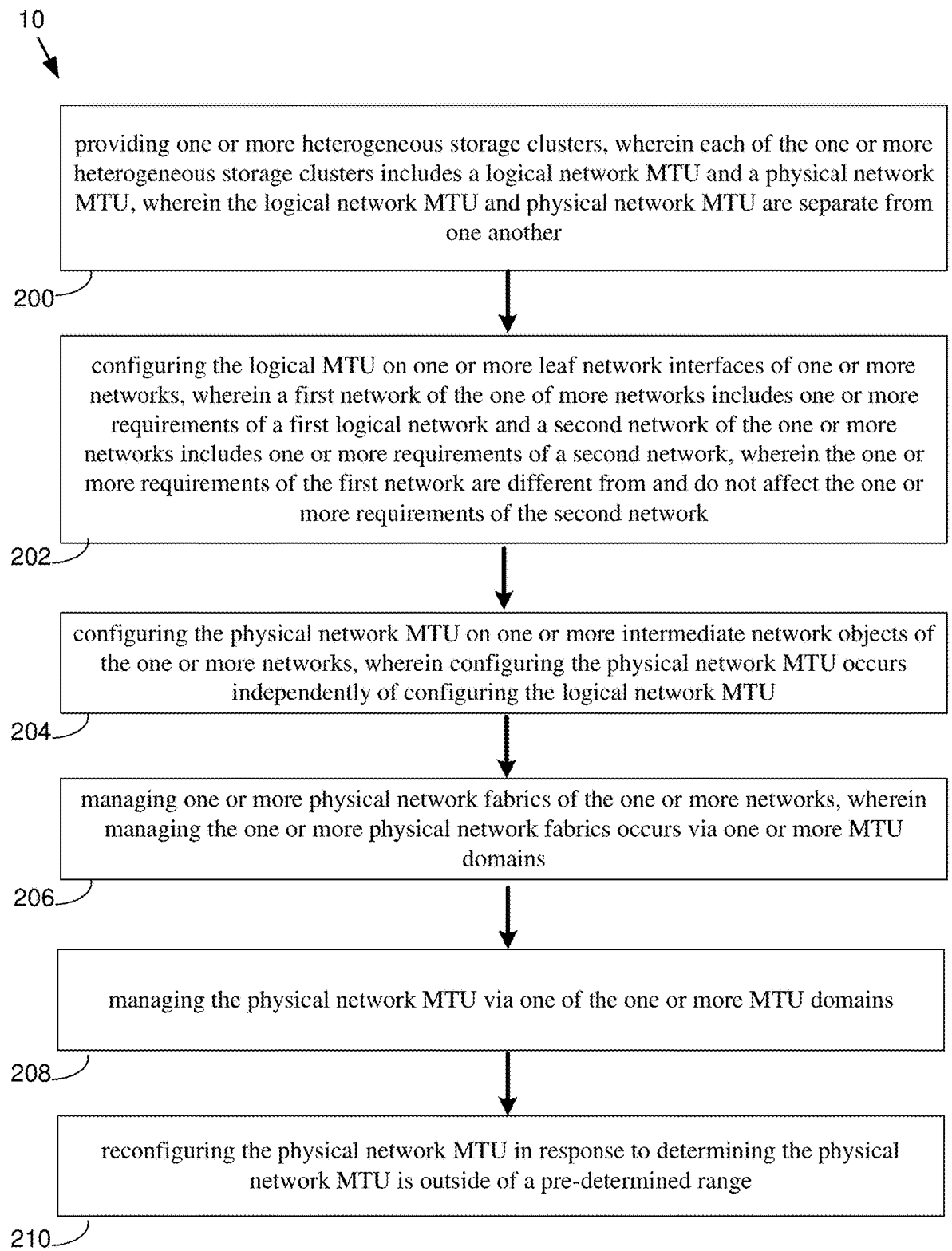
FIG. 2 is a flowchart of a network MTU management system, in accordance with an embodiment of the present disclosure.

Referring now to FIG. 2, a flowchart depicting examples of operations that may be used in accordance with network MTU management process 10 is provided. Operations may include providing 200 one or more heterogeneous storage clusters. Each of the one or more heterogeneous storage clusters may include a logical network MTU and a physical network MTU. The logical network MTU and the physical network MTU may be separate from one another. The logical MTU may be configured 202 on one or more leaf network interfaces of one or more networks. A first network of the one of more networks may include one or more requirements of a first logical network and a second network of the one or more networks may include one or more requirements of a second network. The one or more requirements of the first network may be different from and may not affect the one or more requirements of the second network. The physical network MTU may be configured 204 on one or more intermediate network objects of the one or more networks. The configuration of the physical network MTU may occur independently of configuring the logical network MTU. One or more physical network fabrics of the one or more networks may be managed 206. The one or more physical network fabrics may be managed via one or more MTU domains. The physical network MTU may be managed 208 via one of the one or more MTU domains. The physical network MTU may be reconfigured 210 in response to determining the physical network MTU is outside of a pre-determined range.

In some embodiments, heterogeneous storage clusters may consist of storage-only and HCI appliances where network configuration may span across multiple components such as storage-only controllers, hypervisor hosts, virtualized controllers, virtualization managers, and physical network fabrics. Further, they may consist of appliances with different number of network ports and I/O modules. In this example, a portion of the network ports may be uniformly configured across one or more cluster nodes. Alternatively, other network ports may be connected to one or more dedicated network fabrics for administrative, performance, security or other reasons. The heterogeneous storage clusters may support several cluster-wide logical networks with different requirements and traffic patterns. For example, a management network may rarely require jumbo frames and usually stays at a standard MTU of 1500, whereas storage, replication and live migration network may often require jumbo frames support (e.g. MTU 9000). Further, backend remote direct memory access (RDMA)/RDMA over covered Ethernet (ROCE) based networks may often benefit from jumbo frames support (e.g. MTU 4200 for ROCE version 2 (ROCEv2)) while various encapsulation technologies like virtual extensible local-area network (VxLAN) or network virtualization using generic routing encapsulation (NVGRE) always require jumbo frames support with MTU about 1600 bytes. Additionally, the one or more heterogeneous storage clusters may be connected to multiple independent network fabrics at the same time. For example, a management network may be configured on top of dedicated out-of-band (OOB) management switches, backend data network (e.g. NVMe-oF) may be configured on top of dedicated backend switches, or other networks may be configured on top of a main network fabric.

In some embodiments, the MTUs themselves may need to be consistently configured end to end. This may include one or more of network fabric (physical switches), physical and virtual interfaces in bare-metal hosts, uplinks of virtual switches in hypervisors and virtual adapters in virtual machines (VMs). However, having a single MTU in the one or more heterogeneous storage cluster may not be sufficient since different logical networks have different requirements. Further, having a simple binary "Jumbo frames enable/disable" control in the one or more heterogeneous storage clusters on per network basis may also have a significant downside because the meaning of jumbo frames may vary by networks. For example, one definition states that any frame with a payload larger than 1500 bytes is a jumbo frame. This approach may introduce unnecessary requirements for separately managed network fabrics and may lead to poor resources utilization.

In some embodiments, changing different MTU values in one or more heterogeneous storage clusters manually may be a tedious and error-prone process because the MTU needs to be changed in the right order on multiple objects. Mistakes in that process may lead to network downtime.

In accordance with an embodiment according to the present disclosure, network MTU management process 10 may be based on the separation of a logical network MTU and a physical (fabric) network MTU (hereinafter "physical network MTU"). One or more MTU domains may be included within the one or more heterogeneous storage clusters. As a result, fully automatic and non-disruptive cluster-wide MTU reconfiguration capabilities may be provided.

In some embodiments, separation of logical network MTU and physical network MTUs may provide a flexible MTU control for a variety of types of traffic on supports of the one or more heterogeneous storage clusters.

In some embodiments, the one or more heterogeneous storage clusters may include one or more third-party components. The one or more third-party components may be embedded into the one or more heterogeneous storage clusters via containerization technologies by separating one or more of a portion of the logical network MTU and a portion of the physical network MTU.

Further, the separation may simplify embedding of third-party components via containerization technologies by separating core and non-core logical network MTUs and physical network MUTs. For example, core logical network MTUs may be used in conjunction with one or more mandatory logical networks. The one or more mandatory logical networks may require or more management networks and one or more storage networks. Further, non-core logical network MTUs may be included to allow for additional functionality of the one or more cluster nodes and may require at least two logical networks. For example, a cloud backup feature may be included and enabled on one or more storage clusters. The cloud backup feature may require an additional logical network to support public cloud access. Further, if an additional logical network may be required to support data migration of a storage cluster that needs to import storage from a legal system. The imported storage may include one or more of a logical unit number (LUN) and a network-attached storage (NAS) server.

Specifically, MTU domains may allow the handling of one or more independent network fabrics interconnecting storage cluster nodes of the one or more heterogeneous storage clusters with any level of granularity without generally compromising simplicity. Examples of one or more network fabrics commonly used for clustered storage systems include one or more of 00B management networks, converged HCI networks and non-volatile memory express over fabrics (NVMe-oF) backend networks. Further, MTU domains may allow efficient management of MTU in one or more heterogeneous storage cluster consisting of storage-only and HCI appliances as well as appliances with a different number of ports.

As a result, fully automatic and non-disruptive cluster-wide MTU reconfiguration support may simplify infrastructure management, reduce TCO and avoid network downtime caused by configuration errors.

In some embodiments, in terms of how logical network MTU and physical network MTUs are separated, a network may be considered cluster-wide and may be called a logical network. The logical network may include one or more of the range of an internet protocol (IP) addresses (IPv4 or IPv6), common network prefix, a gateway, and virtual local-area network (VLAN) ID. Though all logical networks may be considered cluster-wide, they need not be configured on all nodes of a storage cluster. For example, in a heterogeneous storage cluster that includes one or more HCI appliances, a VM live migration logical network may be configured only on HCI appliances. A rationale for why all networks are cluster-wide by default may be that the appliances in the one or more heterogeneous storage clusters may be reconfigured during the one or more heterogeneous storage clusters' lifetime, including personality change. For example, a storage-only appliance may be converted to a HCI appliance.

Further, IP addresses from logical networks may be configured on dedicated or shared physical ports of one or more storage appliances. Physical network ports of each of the one or more storage appliances may be connected to one or more network fabrics.

In some embodiments, the logical network MTU may be decoupled from the physical network MTU. However, the physical network MTU may need to be aligned with the MTU configured on the one or more network fabrics. Logical network MTU may then be determined by the needs of a particular network in the one or more heterogeneous storage clusters. For example, a management network may rarely require jumbo frames support. However, VM live migration or storage networks may benefit greatly from jumbo frames.

In some embodiments, the physical network MTU may be configured on one or more intermediate network objects of the one or more networks may allow for encapsulation of the one or more networks and use of one or more hyper-converged infrastructure (HCI) systems without affecting at least a portion of the first logical network and at least a portion of the second logical network.

In some embodiments, the one or more HCI systems may include one or more of virtual switch managed network ports and network ports managed directly by a virtualized storage controller.

In some embodiments, the separation of the logical network MTU from the physical network MTU may satisfy a requirement that one or more heterogeneous storage clusters may require physical network MTU change without changing the MTU on any of its core logical networks. In HCI clusters, this may include enablement of network encapsulation or tunneling technologies on the hypervisor host that usually requires larger MTU (i.e. approximately 1600 bytes for VxLAN). However, the core logical networks of the one or more heterogeneous storage clusters must not be affected by the change. For example, installation of VMware NSX on top of HCI cluster may require an increase of physical network MTU for VxLAN virtual tunnel endpoints (VTEPs). Additionally, a user of one or more VM networks may be configured on top of the same virtual switches as core logical networks. However, the one or more VM networks may be managed by bypassing a cluster control plane of the HCI. For example, this may be done via virtualization managers like VMware vCenter or Microsoft SCVMM. If at least one user network requires the jumbo frames, then physical network MTU may be increased, but the core logical networks MTUs do not need to change.

Another challenge faced is that the one or more heterogeneous storage clusters may not always be static. Additionally, the one-or-more storage clusters may not always be pre-defined. In some cases, additional features may be embedded into one of the one or more heterogeneous storage clusters in the form of third party containerized applications. Such applications may have different MTU requirements which may not be known beforehand. Therefore, separating the logical network MTU and physical network MTU may greatly simplify dynamic expansion of heterogeneous storage cluster functionality because core logical networks may not be affected by the requirements of new logical networks. If a new logical network requires jumbo frames support, then it may be implemented via the same logical network MTU and physical network MTU management approach.

In some embodiments, the one or more heterogeneous storage clusters may have purely internal and fully automatically managed logical networks. Network MTU management process 10 defines two possible MTU management policies for such networks, including: (1) always use a default MTU 1500 since it may be the best choice for internal management, clustering or discovery networks; and (2) always follow the physical network MTU since it may be beneficial for intra-cluster data mobility networks.

In some embodiments, though network MTU management process 10 may separate the logical network MTU and the physical network MTU, the MTU not be arbitrarily changed independently since they are closely related to each other. Therefore, MTU of any logical network must never exceed the physical network MTU, as illustrated below in Equation 1:

$$MTU_{logical\ network\ X} <= MTU_{physical\ network} \quad \text{Equation 1}$$

In some embodiments, a physical network MTU range may be between 1500-9000. The lower bound may be mandated by an Ethernet standard. For example, any Ethernet device must support at least 1500 bytes MTU. The upper bound may reflect the fact that even though many network switches support slightly higher maximum MTU, for interoperability reasons it is proposed to use 9000 as the upper bound for the physical network MTU range as virtually all network switches claiming jumbo frames support are able to handle this MTU.

In some embodiments, in HCI or heterogeneous storage clusters using an external virtualization manager, the upper bound may be defined by the virtualization system (i.e. VMware vCenter may not allow for the ability to configure MTU higher than 9000 on the virtual switches).

In some embodiments, a logical network MTU range between [1280-$MTU_{physical\ network}$] may be used. The upper bound may be determined by the current physical network MTU since the logical network MTU must not exceed the upper bound to avoid dropping of oversized frames. The lower bound may be chosen based on the fact that almost all modern storage systems support IPv6 only or dual-stack deployments and MTU 1280 is the minimum supported IPv6 MTU. Further, the lower bound may be chosen based on the fact that in HCI or heterogeneous storage clusters using the external virtualization manager, the lower bound may be defined by the virtualization system. For example, VMware vCenter does not allow to configure MTU lower than 1280 on the virtual switches. The lower bound may be set to the minimum IPv4 MTU 576 for certain deployments.

In execution, in some embodiments the system may set the initial physical network MTU and initial MTU for all logical networks to 1500. This is a safe default value which may work with all network fabrics and can then be changed as needed later via a storage cluster distributed control plane of the one or more heterogeneous storage clusters.

Figure 3:
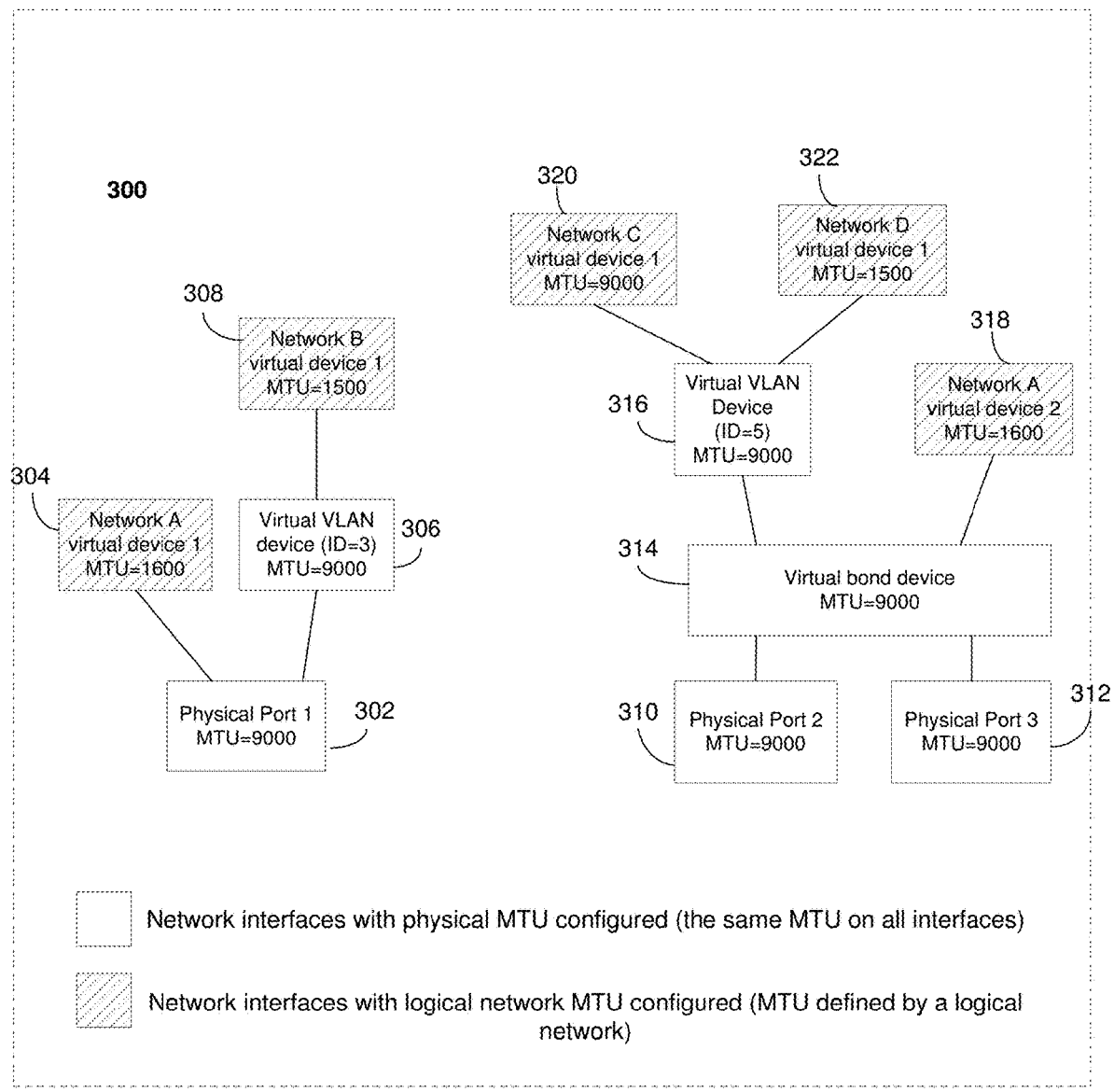
FIG. 3 is a block diagram of a network MTU management system, in accordance with an embodiment of the present disclosure.

In some embodiments, an implementation of network MTU management process 10 using leaf virtual devices is described. In most operating systems, MTU may be configured on physical and virtual interfaces. As such, network MTU management process 10 proposes using the organization of the virtual interfaces, which allows one or more of the following: (1) sharing of the VLAN ID between logical networks; (2) independent MTU configuration for each logical network; and (3) independent configuration of physical and logical network MTUs. FIG. 3 illustrates this embodiment.

Further, FIG. 3 illustrates a rule that in a hierarchy of network interfaces rooted at one or more of the physical ports, only the leaf network interfaces may correspond to the logical networks and may have logical network MTU configured. All root and intermediate network interfaces may have physical network MTU configured.

Specifically, storage controller 300 may include physical port 302. Physical port 302 may have a MTU equal to 9000. Physical port 302 may be connected to network A virtual device 304. Network A virtual device 304 may have a MTU equal to 1600. Physical port 302 may also be connected to virtual VLAN device 306. Virtual VLAN device 306 may have an ID equal to three. Virtual VLAN device 306 may have a MTU equal to 9000. Virtual VLAN device 306 may be connected to network B virtual device 308. Network B virtual device 308 may have a MTU equal to 1500.

In some embodiments, physical port 310 may be connected to virtual bond device 314. Physical port 310 may have a MTU equal to 9000. Physical port 312 may also be connected to virtual bond device 314. Physical port 3 may have a MTU equal to 9000. Virtual bond device 314 may have a MTU equal to 9000. Virtual bond device 314 may be connected to virtual VLAN device 316. Virtual VLAN device 316 may have an ID equal to five. Network C virtual device 320 may be connected to virtual VLAN device 316. Network C virtual device 320 may have a MTU equal to 9000. Network D virtual device 322 may also be connected to virtual VLAN device 316. Network D virtual device 322 may have a MTU equal to 1500. Network A virtual device 318 may also be connected to virtual bond device 314. Network A virtual device 318 may have a MTU equal to 1600.

In some embodiments, physical port 302, virtual VLAN device 306, physical port 310, physical port 312, virtual bond device 314, and virtual VLAN device 316 may operate on one or more network interfaces where the physical network MTU may be configured with the MTU the same on all interfaces. Additionally, network A virtual device 304, network B virtual device 308, network C virtual device 320, network D virtual device 322, and network A virtual device 318 may operate on one or more network interfaces having logical network MTU configured. The MTU may be defined by a logical network.

In some embodiments, there may be multiple operating system-specific options for the leaf virtual devices implementation. For example, in Linux OS media access control address (MAC) VLAN or IPVLAN virtual devices implementation may be used.

In some embodiments, network MTU management process 10 may be applied to virtualized storage controllers running on hypervisor nodes in conjunction with one or more HCI or heterogeneous storage clusters. In addition to the storage system (i.e. a guest) OS, networking may also be configured directly on the hypervisor. A virtual switch may include physical ports and may have hypervisor interfaces configured on top of it. Virtual machines, which may include a virtualized storage controller, may have virtual adapters connected to the virtual switch. Therefore, virtual adapters may be used in a trunk mode to allow for VLAN handling to be performed within the virtualized storage controller. However, hypervisor interfaces corresponding to the logical networks (e.g. management or VM live migration) may have VLAN configuration on the hypervisor side. Further, hypervisor interfaces corresponding to the logical networks may include management or VM live migration.

In some embodiments, on HCI appliances with a large number of I/O modules and physical network ports, some ports may be configured in a "pass-through" mode where the ports may be allowed to be directly managed by the virtualized storage controller. As a result, the ports may bypass the a virtual networking layer in the hypervisor The ports may bypass the a virtual networking layer in the hypervisor partially. Alternatively, the ports may bypass the a virtual networking layer in the hypervisor completely. MTU management on the ports in "pass-through" mode may be handled exactly the same as on non-virtualized storage controllers. This configuration may allow for a unified approach to managing MTUs on one or more HCI clusters.

Figure 4:
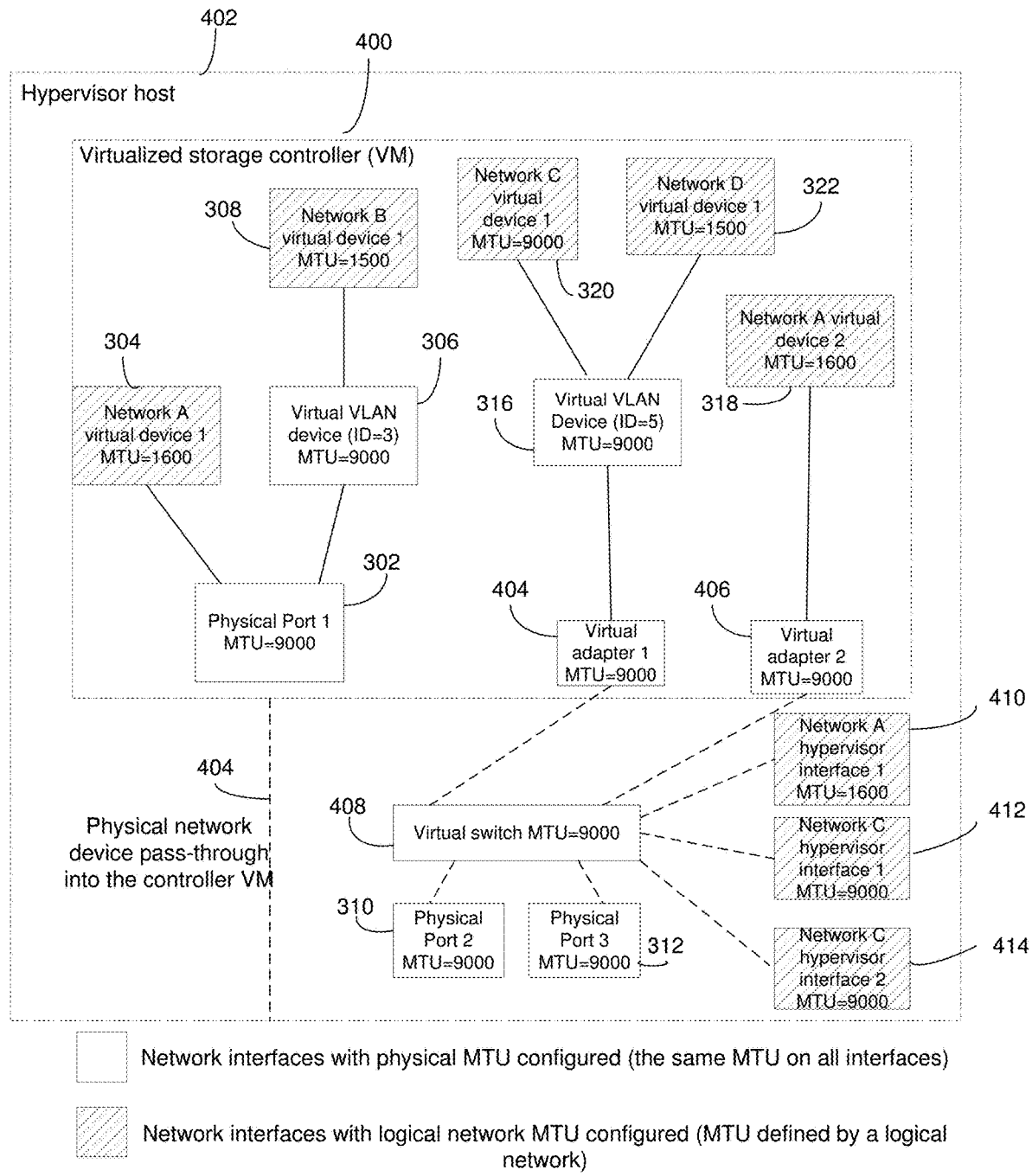
FIG. 4 is a block diagram of a network MTU management system, in accordance with an embodiment of the present disclosure.

Referring to FIG. 4, an embodiment in accordance with the present disclosure illustrating network MTU management process 10 on HCI nodes and one or more virtualized storage controllers is provided. Specifically, the logical network MTU may be configured on the leaf network interfaces, which may include the interface of the hypervisor. Physical network MTU may be configured on all intermediate network objects. The intermediate network objects may include one or more virtual switches and virtual network adapters in the virtualized storage controller.

In some embodiments, virtualized storage controller (VM) 400 may be located within hypervisor host 402. may include physical port 302. Physical port 302 may have a MTU equal to 9000. Physical port 302 may be connected to network A virtual device 304. Network A virtual device 304 may have a MTU equal to 1600. Physical port 302 may also be connected to virtual VLAN device 306. Virtual VLAN device 306 may have an ID equal to three. Virtual VLAN device 306 may have a MTU equal to 9000. Virtual VLAN device 306 may be connected to network B virtual device 308. Network B virtual device 308 may have a MTU equal to 1500. Physical port 302 may include a physical network device pass-through 404 into a controller of VM 400 from hypervisor host 402.

In some embodiments, virtual adapter 404 may also be included in VM 400. Virtual adapter 404 may have a MTU equal to 9000. Virtual adapter 404 may be connected to virtual VLAN device 316. Virtual VLAN device 316 may have an ID equal to five. Virtual VLAN device 316 may have a MTU equal to 9000. Virtual VLAN device 316 may be connected to network C virtual device 320. Network C virtual device 320 may have a MTU equal to 9000. Network D virtual device 322 may also be connected to virtual VLAN device 316. Network D virtual device 322 may have a MTU equal to 1500.

In some embodiments, VM 400 may also include virtual adapter 406. Virtual adapter 406 may have a MTU equal to 9000. Virtual adapter 406 may be connected to network A virtual device 318. Network A virtual device 318 may have a MTU equal to 1600.

In some embodiments, hypervisor host 402 may also include virtual switch 408. Virtual switch 408 may have a MTU equal to 9000. Virtual switch 408 may be connected to virtual adapter 404. Virtual switch 408 may also be connected to virtual adapter 406. Physical port 310 may also be connected to virtual switch 408. Physical port 310 may have a MTU equal to 9000. Physical port 312 may also be connected to virtual switch 408. Physical port 312 may have a MTU equal to 9000.

Network A hypervisor interface 410 may also be connected to virtual switch 408. Network A hypervisor interface 410 may have a MTU equal to 1600. Network C hypervisor interface 412 may be connected to virtual switch 408. Network C hypervisor interface 412 may have a MTU equal to 9000. Network C hypervisor interface 414 may also be connected to virtual switch 408. Network C hypervisor interface 414 may have a MTU equal to 9000.

In some embodiments, physical port 302, virtual VLAN device 306, virtual adapter 404, virtual VLAN device 316, virtual adapter 406, virtual switch 408, physical port 310, and physical port 312 may operate on one or more network interfaces comprised of one or more intermediate network objects where the physical network MTU may be configured with the MTU the same on all interfaces. Additionally, network A virtual device 304, network B virtual device 308, network C virtual device 320, network D virtual device 322, network A virtual device 318, network A hypervisor interface 410, network B hypervisor interface 412, and network C hypervisor interface 414 may operate on one or more network interfaces comprised of one or more leaf network interfaces having logical network MTU configured. The MTU may be defined by a logical network.

In some embodiments, one or more physical ports of a storage controller may be connected to one or more network fabrics. For example, in at least a portion of the one or more heterogeneous storage clusters, all storage controllers may have the same number of ports. Further, all ports may be connected to a single converged network fabric. The storage clusters may include one or more homogeneous HCI clusters.

Figure 5:
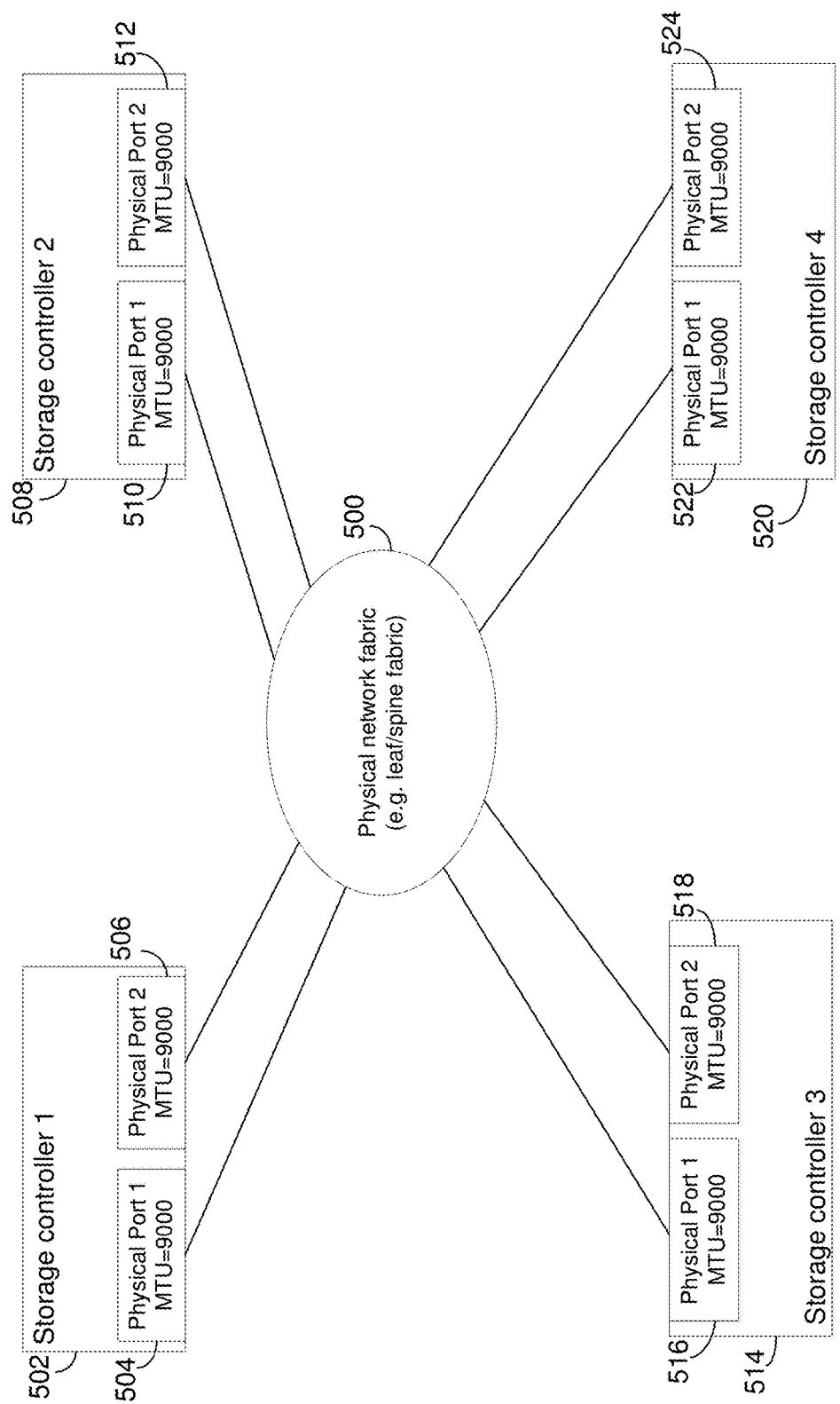
FIG. 5 is a diagram of a network MTU management system, in accordance with an embodiment of the present disclosure.

Referring to FIG. 5, FIG. 5 demonstrates the above embodiment. Specifically, physical network fabric 500 may be connected to storage controller 502 via physical port 504 and physical port 506. Physical network fabric may be comprised of a leaf/spine fabric. In the leaf/spine fabric, one or more servers may be connected to one or more leaf switches. Further, the one or more leaf switches may be connected to one or more spine switches. In this arrangement, the one or more leaf switches are not directly connected to one another. Further, the one or more spine switches are not directly connected to one another. Physical network fabric 500 may also be connected to storage controller 508 via physical port 510 and physical port 512. Further, physical network fabric 500 may be connected to storage controller 514 via physical port 516 and physical port 518. Physical network fabric 500 may also be connected to storage controller 520 via physical port 522 and physical port 524. Further, the MTUs of all the physical ports present may be equal to 9000.

Figure 6:
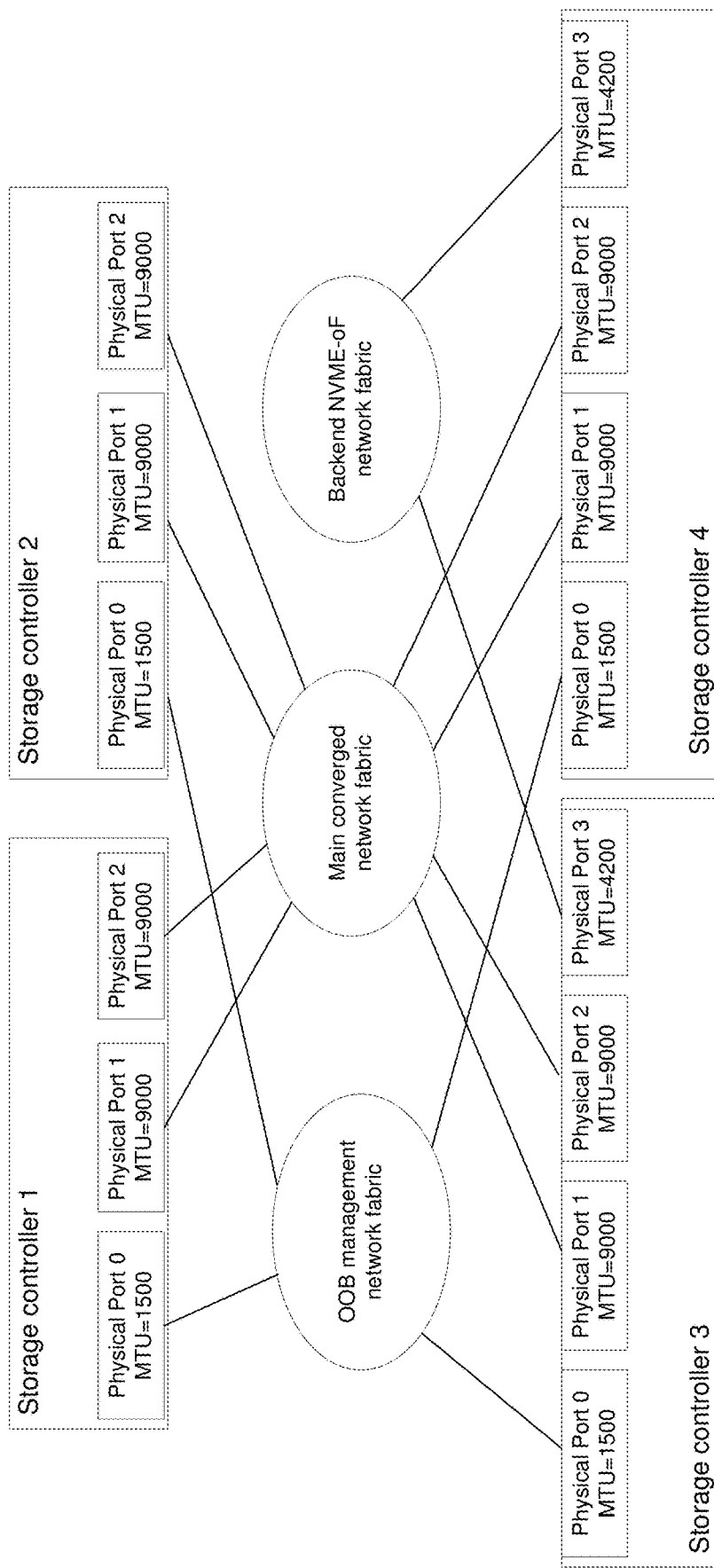
FIG. 6 is a diagram of a network MTU management system, in accordance with an embodiment of the present disclosure.

In some embodiments, as illustrated in FIG. 6, multiple independent network fabrics may be used in one or more heterogeneous storage clusters. The one or more heterogeneous storage clusters may include one or more storage controllers. The one or more storage controllers may have non-uniform connectivity. In this embodiment, the one or more heterogeneous storage clusters may not define a single physical network MTU due to the one or more heterogeneous clusters requiring multiple network fabrics. Further, each network fabric may include different MTU settings. Therefore, multiple physical network MTU on a side of the one or more storage clusters may be required.

For example, this embodiment may include one or more of main converged fabric network 600, OOB management network fabric 602, and backend NVME-oF network fabric 604. The embodiment may also include one or more of storage controller 606, storage controller 614, storage controller 622, and storage controller 632.

In some embodiments, storage controller 606 may include one or more of physical port 608, physical port 610, and physical port 612. Physical port 608 may have a MTU equal to 1500. Physical port 608 may be directly connected to OOB management network fabric 602. Physical port 610 may have a MTU equal to 9000. Physical port 610 may be directly connected to main converged network fabric 600. Further, physical port 612 may have a MTU equal to 9000. Physical port 612 may be directly connected to main converged network fabric 600.

In some embodiments, storage controller 614 may include one or more of physical port 616, physical port 618, and physical port 620. Physical port 616 may have a MTU equal to 1500. Physical port 616 may be directly connected to OOB management network fabric 602. Physical port 618 may have a MTU equal to 9000. Physical port 618 may be directly connected to main converged network fabric 600. Further physical port 620 may have a MTU equal to 9000. Physical port 620 may be directly connected to main converged network fabric 600.

In some embodiments, storage controller 622 may include one or more of physical port 624, physical port 626, physical port 628 and physical port 630. Physical port 624 may have a MTU equal to 1500. Physical port 624 may be directly connected to OOB management network fabric 602. Physical port 626 may have a MTU equal to 9000. Physical port 626 may be directly connected to main converged network fabric 600. Further, physical port 628 may have a MTU equal to 9000. Physical port 628 may be directly connected to main converged network fabric 600. Physical port 630 may have a MTU equal to 4200. Physical port 630 may be directly connected to backend NVME-oF network fabric 604.

In some embodiments, storage controller 632 may include one or more of physical port 634, physical port 636, physical port 638 and physical port 640. Physical port 634 may have a MTU equal to 1500. Physical port 634 may be directly connected to OOB management network fabric 602. Physical port 636 may have a MTU equal to 9000. Physical port 636 may be directly connected to main converged network fabric 600. Further, physical port 638 may have a MTU equal to 9000. Physical port 638 may be directly connected to main converged network fabric 600. Physical port 640 may have a MTU equal to 4200. Physical port 640 may be directly connected to backend NVME-oF network fabric 604.

In some embodiments, one or more MTU domains may be introduced. Each of the one or more MTU domains may represent an association between one or more network ports on one or more storage controllers and one or more network fabrics (i.e. 600, 602, 604) the one or more network ports are connected to. Regarding the physical network MTU in one or more heterogeneous storage clusters, the physical network MTU may be defined at a MTU domain level.

In some embodiments, the one or more MTU domains may include one or more of a uniform MTU domain (UMD) and a non-uniform MTU domain (NUMD). Specifically, there may be at least two MTU domain levels. For example, there may be one or more of a uniform MTU domains (UMD) present and a non-uniform MTU domain (NUMD). The UMD may contain one or more networks ports available on each of the one or more storage controllers in the one or more heterogeneous storage clusters. The one or more network ports may automatically extended or shrink upon adding or removing one or more storage appliances in the one or more heterogeneous storage cluster. Additionally, the NUMD may be configured at a desired level of granularity. For example, the NUMD may be configured in a manner including one or more of the following: per-port, per I/O module, per storage controller, and per storage appliance. Further, one or more independent physical network fabrics may be managed by the one or more MTU domains.

In some embodiments, as shown in FIG. 6, 00B management network fabric 602, physical port 608, physical port 616, physical port 622, and physical port 634 may operate on a UMDs. Further, physical port 610, physical port 612, physical port 618, physical port 620, physical port 626, physical port 628, physical port 636 and physical port 638 may operate on another uniform MTU domain. Physical port 630 and physical port 640 may operate on a NUMD. The NUMD may contain one or more network ports from two of the one or more storage controllers. For example, the NUMD may contain one or more network ports from storage controller 622 and storage controller 632.

In some embodiments, the UMD and NUMD domains may be considered storage cluster-wide. The NUMD may contain one or more network ports that are uniformly configured across one of the one or more heterogeneous storage clusters. However, in a heterogeneous storage clusters, the one or more network ports may be configured differently for storage-only and HCI controllers. This different configuration may allow use of a single UMD when all of the one or more network ports of the respective UMD are connected to a single network fabric.

Figure 7:
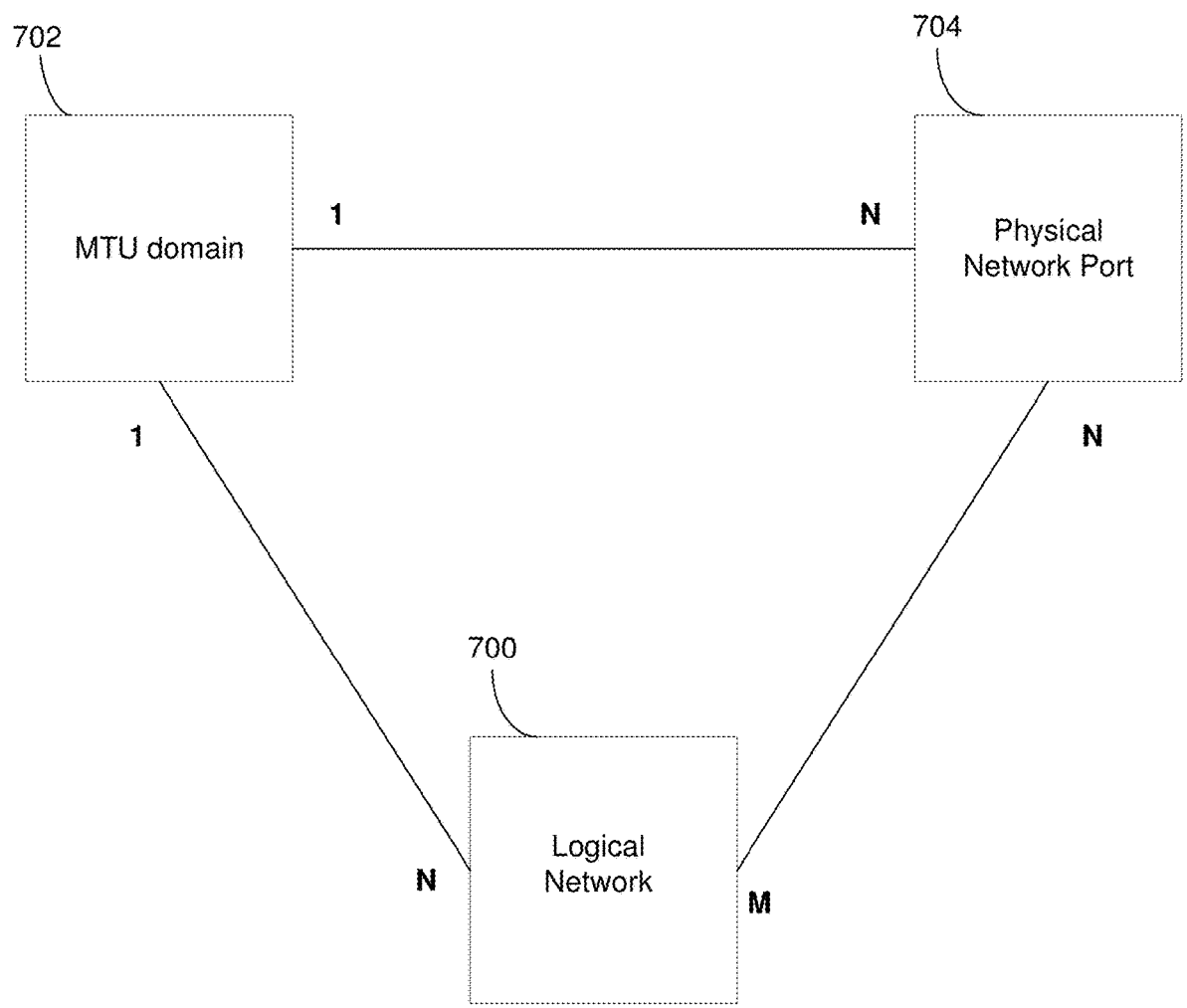
FIG. 7 is a block diagram of a network MTU management system, in accordance with an embodiment of the present disclosure.

Referring to FIG. 7, an embodiment of the present disclosure is shown. Specifically, the association between a logical network and a logical network MTU and one or more MTU domains and one or more network ports is illustrated. Each of the one or more MTU domains may have its own associated physical network MTU. For example, logical network 700 may be connected to MTU domain 702, which may be connected to physical network port 704. Further, logical network 700 may be connected to MTU domain 702 in a one to many relationship, denoted as 1:N. Physical network port 704 may be connected to logical network 700 in a many to many relationship, denoted as N:M. Moreover, MTU domain 702 may be connected to physical network port 704 in a 1:N relationship. Though not illustrated in FIG. 7, any of the above connections may be made over a one to one relationship, denoted as 1:1.

In some embodiments, one or more UMDs and NUMDs may be included in the one or more heterogeneous storage clusters. The number of UMDs and NUMDs may be defined by the requirements of a particular storage cluster. Therefore, one or more MTU domains may be initially defined. The pre-defined MTU domains may initially have a physical network with a MTU equal to 1500. Further, the following domains may be used: (1) UMDs needed for mandatory cluster-wide traffic (i.e. OOB management UMD or converged network UMD); and (2) a special unallocated NUMD containing all ports not consumed by the initial default UMDs.

In some embodiments, since each port of the one or more network ports may belong to a single network fabric and, as a result, a single MTU domain, the one or more network ports may only be moved between the MTU domains.

Heterogeneous storage cluster specific constraints may apply. As a result, not all ports of the one or more network ports may be moved between the MTU domains. For example, removal of individual ports for the one or more network ports from the default UMDs may not be allowed because it may violate a rule regarding the uniform nature of UMDs. However, it may be safe to move one of the one or more network ports between NUMDs. It may also be safe to move the one of the one or more network ports from NUMD to UMD.

In some embodiments, in heterogeneous storage clusters, if an external virtualization manager is being used, additional constraints may exist. For example, one or more network ports belonging to a single virtual switch may often have a common MTU value. Therefore, it may not be possible to configure a different physical network MTU by moving one of the one or more network ports to a different MTU domain. Further, even if the one or more network ports are physically connected to one or more different network fabrics, they may be managed by a single MTU domain due to the external constraints.

In some embodiments, up to two UMDs may be required. For example, this may be the case where a single UMD containing all of the one or more network ports for the one or more storage heterogeneous storage clusters may be plugged into the single converged network fabric. Further, two independent UMDs may be needed for one or more storage clusters that implement physical separation of data and management networks. In this scenario, one UMD may be needed for a dedicated OOB management network. Additionally, one UMD may be needed for a data network.

In some embodiments, a plurality of the one or more network ports on the one or more appliances may be dedicated to replication traffic. Further, the plurality of the one or more network ports may be plugged into a high-bandwidth network fabric. For example, this may be implemented by creating a new UMD and moving a plurality of the one or more network ports from an unallocated NUMD to the new UMD.

In some embodiments, an appliance in the one or more heterogeneous storage clusters may require backend storage expansion via the use of external NVMe-oF disk array enclosure (DAE) connected to the appliance via one or more dedicated network ports. However, other appliances may not need to be connected to an external DAE. This may be implemented by creating a new NUMD. Further, one of the one or more network ports associated with the one or more appliances may be moved from an unallocated NUMD to the new NUMD.

In some embodiments, the logical network MTU may be reconfigured in response to determining the logical network MTU is outside of a pre-determined range.

Figure 8:
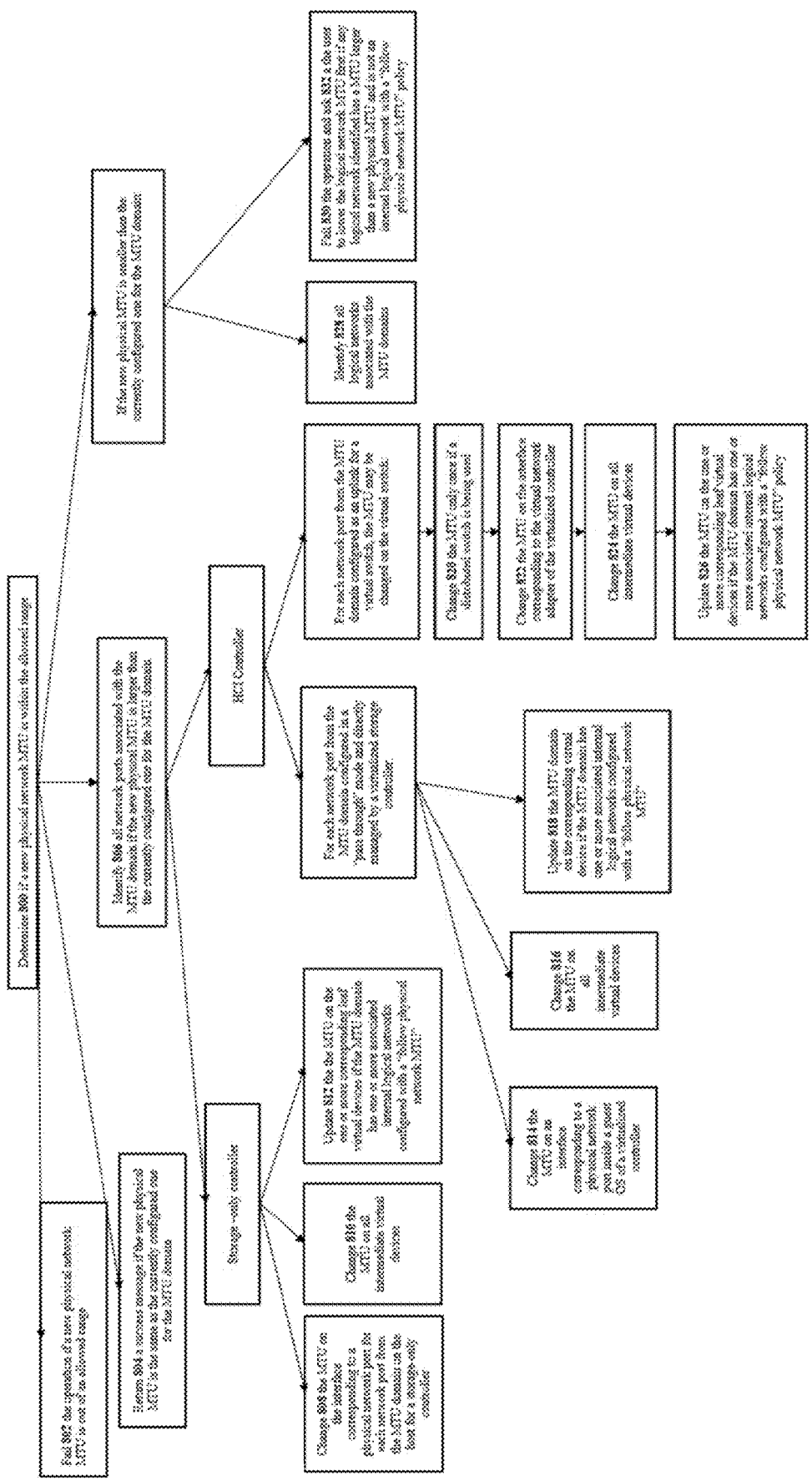
FIG. 8 is a flowchart of a network MTU management system, in accordance with an embodiment of the present disclosure.

In some embodiments, as shown in FIG. 8, a MTU may be changed automatically. A MTU may initially be configured to 1500 on one or more UMDs present. Further, the MTU may be unallocated on any NUMDs present. The MTU may also be configured on any logical networks present.

In some embodiments, the physical network MTU may be changed within a given MTU domain in light of the following processes. First, if a new physical network MTU is determined 800 to be out of an allowed range, the operation may fail 802. The allowed MTU range may be between 1500-9000. If a new physical network MTU is identical to one for the currently configured one for the MTU domain, then a success message may be returned 804. The success message may be returned 804 immediately.

In some embodiments, if a new physical network MTU is larger than the currently configured one for the MTU domain, then all storage controllers corresponding to the one or more network ports associated with the MTU domain may be identified 806. The following processes may occur on one or more storage nodes of the one or more heterogeneous storage clusters sequentially in order to avoid disruption. For the one or more storage controllers present, if there is a storage-only controller, each MTU on an interface corresponding to the one or more physical network ports may be changed 808 for each of the one or more network ports from the MTU domain on a host. Further, the MTU may be changed 810 on all intermediate virtual devices up to but not including virtual devices representing one or more logical networks for each of the one or more network ports from the MTU domain on a host. Here, strict order from a root device to one or more leaf devices must be adhered to. Further, if a MTU domain has one or more associated internal logical networks configured with a "follow physical network MTU" policy, the MTU may be updated 812 on one or more corresponding leaf virtual devices for each of the one or more network ports from the MTU domain on a host.

In some embodiments, if one or more HCI controllers are present, the MTU may be changed 814 on an interface corresponding to a physical network port inside a guest OS of a virtualized controller for each of the one of more network ports from the MTU domain that is configured in a "pass through" mode and is directly managed by a virtualized storage controller. Further, each MTU on all intermediate virtual devices may be changed 816 up to but not including virtual devices representing each logical network inside the guest OS of the virtualized controller for each of the one of more network ports from the MTU domain that is configured in a "pass through" mode and is directly managed by a virtualized storage controller. Here, strict order from the root devices to the one or more leaf devices must be adhered to. Additionally, if the MTU domain has one or more associated internal logical networks configured with a "follow physical network MTU" policy, then the MTU may be updated 818 on the corresponding leaf virtual devices for each of the one of more network ports from the MTU domain that is configured in a "pass through" mode and is directly managed by a virtualized storage controller.

In some embodiments, if a network port from the MTU domain is configured as an uplink virtual switch, then the MTU on the virtual switch may be changed. Specifically, if a distributed virtual switch is being used, then the MTU may be changed 820 only once rather than changing it for each HCI storage controller as an optimization. Further, the MTU may be changed 822 on the an interface corresponding to the virtual network adapter of the virtualized controller. The MTU may also be changed 824 on all intermediate virtual devices up to but not including virtual devices representing each logical network. Here, strict order from the root devices to the one or more leaf devices must be adhered to. Additionally, the MTU may be updated 826 on the corresponding leaf virtual devices if the MTU domain has an associated internal logical networks configured with "follow physical network MTU" policy.

In some embodiments, if a new physical network MTU is smaller than the currently configured one for the MTU domain, then all logical networks associated with the MTU domain may be identified 828. Further, if any logical network identified has MTU larger than a new physical network MTU and it is not an internal logical network with a "follow physical network MTU" policy, the operation may fail 830. A user may be asked 832 to lower the logical network MTU. If not, the above listed processes for a new physical network MTU being larger than the currently configured one for the MTU domain may be repeated with reserved order of operations. For example, the processes may be applied from one more leaf virtual interfaces down to one or more root interfaces.

This process may assume that increase of the physical network MTU is completed after the MTU is increased on the physical network fabric. The physical network fabric may not be considered as a part of the one or more heterogeneous storage clusters.

Figure 9:
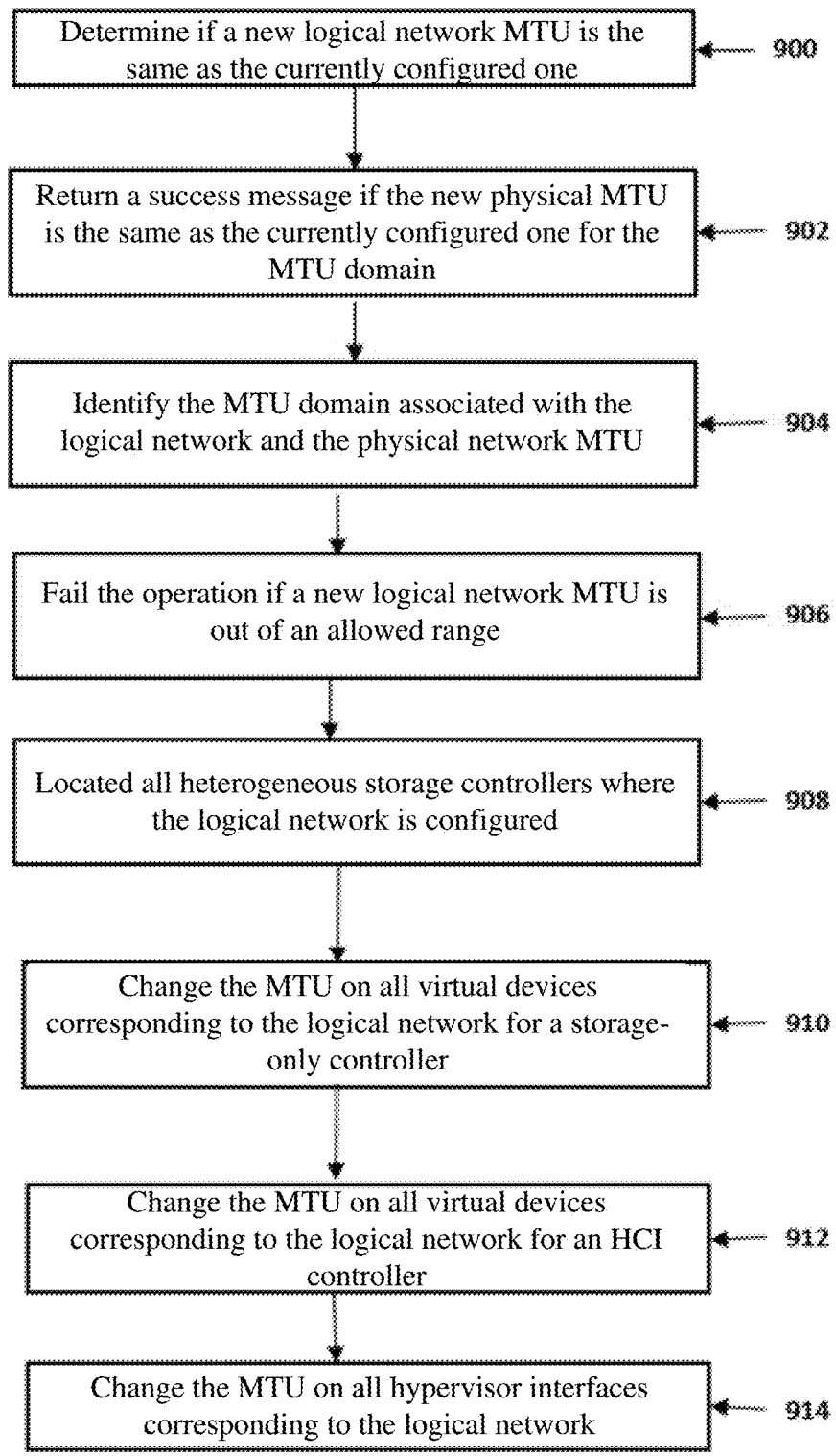
FIG. 9 is a flowchart of a network MTU management system, in accordance with an embodiment of the present disclosure.

In some embodiments, as shown in FIG. 9, the logical network MTU may be changed by the following processes. If a new logical network MTU is determined 900 to be the same as the currently configured one, then a success message may be returned 902. The success message may be returned 902 immediately. The MTU domain that the logical network is associated with and physical network MTU configured for the MTU domain both may be identified 904. Further, if a new logical network MTU is out of an allowed range, the operation may fail 906. The allowed range may be between [1280-MTUphysical network]. If not, then all heterogeneous storage controllers where the logical network is configured may be located 908. However, the logical network may have a smaller scope than the associated MTU domain. Additionally, for each storage controller, if there is one or more storage-only controllers present, then the MTU may be changed 910 on all virtual devices corresponding to the logical network. If one or more HCI controllers are present, then the MTU may be changed 912 on all virtual devices corresponding to the logical network. This may occur inside the guest OS of the virtualized controller. Further, the MTU may be changed 914 on all hypervisor interfaces corresponding to the logical network.

In some embodiments, the one or more heterogeneous storage clusters may be configured to support jumbo frames while avoiding overprovisioning of system buffers.

As a result of the logical network MTU being changed, one or more jumbo frames may be supported on a per-logical network basis, which allows for system resources to be efficiently utilized (i.e. RAM). Further, overprovisioning of one or more system buffers may be avoided.

In some embodiments, one or more control planes of the one or more heterogeneous storage clusters distributed control plane may execute relevant reconfiguration operations via an internal intra-cluster network because MTU domains and logical networks may be considered cluster-wide. In this scenario, a default MTU of 1500 may be assigned to the internal network and not changed. As a result, the executed commands may not be disturbed during cluster-wide MTU change orchestration since the physical network MTU is guaranteed to be at least 1500 bytes.

As a result of the above embodiments of the present disclosure, network MTU management process 10 may be applied to one or more of a complicated network configuration and a common/standard network configuration. Further, network MTU management process 10 does not introduce any unnecessary requirements for independently managing the physical network fabric.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for cluster-wide management of one or more maximum transmission units (MTUs) for clustered and federated storage systems comprising:
providing one or more heterogeneous storage clusters, wherein each of the one or more heterogeneous storage clusters includes a logical network MTU and a physical network MTU, wherein the logical network MTU and physical network MTU are separate from one another;
configuring the logical network MTU on one or more leaf network interfaces of one or more networks, wherein configuring the logical network MTU on the one or more leaf network interfaces of the one or more networks includes configuring the logical network MTU to be less than or equal to the physical network MTU;
configuring the physical network MTU on one or more intermediate network objects of the one or more networks, wherein configuring the physical network MTU occurs independently of configuring the logical network MTU;
managing one or more physical network fabrics of the one or more networks, wherein managing the one or more physical network fabrics occurs via one or more MTU domains;
managing the physical network MTU via one of the one or more MTU domains; and
reconfiguring the physical network MTU in response to determining the physical network MTU is outside of a pre-determined range.

2. The computer-implemented method of claim 1, wherein the one or more heterogeneous storage clusters include one or more third-party components, wherein the one or more third-party components are embedded into the one or more heterogeneous storage clusters via containerization technologies by separating one or more of a portion of the logical network MTU and a portion of the physical network MTU.

3. The computer-implemented method of claim 1, wherein configuring the physical network MTU on one or more intermediate network objects of the one or more networks allows for encapsulation of the one or more networks and use of one or more hyper-converged infrastructure (HCI) systems without affecting at least a portion of the first logical network and at least a portion of the second logical network.

4. The computer-implemented of claim 3, wherein the one or more HCI systems include one or more of virtual switch managed network ports and network ports managed directly by a virtualized storage controller.

5. The computer-implemented method of claim 1, wherein the one or more MTU domains include one or more of a uniform MTU domain (UMD) and a non-uniform MTU domain (NUMD).

6. The computer-implemented method of claim 1, further comprising reconfiguring the logical network MTU in response to determining the logical network MTU is outside of a pre-determined range.

7. The computer-implemented method of claim 1, wherein the one or more heterogeneous storage clusters are configured to support jumbo frames while avoiding over-provisioning of system buffers.

8. A computing system including a processor and a memory system configured to perform operations comprising:
   providing one or more heterogeneous storage clusters, wherein each of the one or more heterogeneous storage clusters includes a logical network MTU and a physical network MTU, wherein the logical network MTU and physical network MTU are separate from one another;
   configuring the logical network MTU on one or more leaf network interfaces of one or more networks, wherein configuring the logical network MTU on the one or more leaf network interfaces of the one or more networks includes configuring the logical network MTU to be less than or equal to the physical network MTU;
   configuring the physical network MTU on one or more intermediate network objects of the one or more networks, wherein configuring the physical network MTU occurs independently of configuring the logical network MTU;
   managing one or more physical network fabrics of the one or more networks, wherein managing the one or more physical network fabrics occurs via one or more MTU domains;
   managing the physical network MTU via one of the one or more MTU domains; and
   reconfiguring the physical network MTU in response to determining the physical network MTU is outside of a pre-determined range.

9. The computing system of claim 8, wherein the one or more heterogeneous storage clusters include one or more third-party components, wherein the one or more third-party components are embedded into the one or more heterogeneous storage clusters via containerization technologies by separating one or more of a portion of the logical network MTU and a portion of the physical network MTU.

10. The computing system of claim 8, wherein configuring the physical network MTU on one or more intermediate network objects of the one or more networks allows for encapsulation of the one or more networks and use of one or more hyper-converged infrastructure (HCI) systems without affecting at least a portion of the first logical network and at least a portion of the second logical network.

11. The computing system of claim 10, wherein the one or more HCI systems include one or more of virtual switch managed network ports and network ports managed directly by a virtualized storage controller.

12. The computing system of claim 8, wherein the one or more MTU domains include one or more of a uniform MTU domain (UMD) and a non-uniform MTU domain (NUMD).

13. The computing system of claim 8, further comprising reconfiguring the logical network MTU in response to determining the logical network MTU is outside of a pre-determined range.

14. The computing system of claim 8, wherein the one or more heterogeneous storage clusters are configured to support jumbo frames while avoiding overprovisioning of system buffers.

15. A computer program product comprising a non-transitory computer readable storage medium having a plurality of instructions stored thereon, which, when executed by a processor, cause the processor to perform operations including:
   providing one or more heterogeneous storage clusters, wherein each of the one or more heterogeneous storage clusters includes a logical network MTU and a physical network MTU, wherein the logical network MTU and physical network MTU are separate from one another;
   configuring the logical network MTU on one or more leaf network interfaces of one or more networks, wherein configuring the logical network MTU on the one or more leaf network interfaces of the one or more networks includes configuring the logical network MTU to be less than or equal to the physical network MTU;
   configuring the physical network MTU on one or more intermediate network objects of the one or more networks, wherein configuring the physical network MTU occurs independently of configuring the logical network MTU;
   managing one or more physical network fabrics of the one or more networks, wherein managing the one or more physical network fabrics occurs via one or more MTU domains;
   managing the physical network MTU via one of the one or more MTU domains; and
   reconfiguring the physical network MTU in response to determining the physical network MTU is outside of a pre-determined range.

16. The computer program product of claim 15, wherein the one or more heterogeneous storage clusters include one or more third-party components, wherein the one or more third-party components are embedded into the one or more heterogeneous storage clusters via containerization technologies by separating one or more of a portion of the logical network MTU and a portion of the physical network MTU.

17. The computer program product of claim 15, wherein configuring the physical network MTU on one or more intermediate network objects of the one or more networks allows for encapsulation of the one or more networks and use of one or more hyper-converged infrastructure (HCI) systems without affecting at least a portion of the first logical network and at least a portion of the second logical network.

18. The computer program product of claim 17, wherein the one or more HCI systems include one or more of virtual switch managed network ports and network ports managed directly by a virtualized storage controller.

19. The computer program product of claim 15, wherein the one or more MTU domains include one or more of a uniform MTU domain (UMD) and a non-uniform MTU domain (NUMD).

20. The computer program product of claim 15, further comprising reconfiguring the logical network MTU in response to determining the logical network MTU is outside of a pre-determined range.

\* \* \* \* \*